April 5, 1960 E. M. PALMER 2,931,567

APPARATUS FOR CONTROLLING AN ANALOG COMPUTER

Filed Jan. 24, 1956 3 Sheets-Sheet 1

INVENTOR.
Elton M. Palmer,
BY
[signature]
ATTORNEY.

April 5, 1960 E. M. PALMER 2,931,567

APPARATUS FOR CONTROLLING AN ANALOG COMPUTER

Filed Jan. 24, 1956 3 Sheets-Sheet 2

INVENTOR.
Elton M. Palmer.
BY
ATTORNEY.

April 5, 1960 E. M. PALMER 2,931,567

APPARATUS FOR CONTROLLING AN ANALOG COMPUTER

Filed Jan. 24, 1956 3 Sheets-Sheet 3

INVENTOR.
Elton M. Palmer
BY
ATTORNEY.

United States Patent Office 2,931,567

Patented Apr. 5, 1960

2,931,567

APPARATUS FOR CONTROLLING AN ANALOG COMPUTER

Elton M. Palmer, Oakmont, Pa., assignor to Gulf Research & Development Company, Pittsburgh, Pa., a corporation of Delaware Application January 24, 1956, Serial No. 560,928

2 Claims. (Cl. 235—61.6)

This invention relates to apparatus for controlling an analog computer, and in particular concerns apparatus employing punched cards on which the distance between holes in the card corresponds to a physical input quantity and the cards are used to control a parametric element of an analog computer.

In copending application S.N. 561,085 now Patent 2,861,507, entitled Seismograph Profile Printer filed concurrently herewith and assigned to the same assignee as the present application, there is disclosed and claimed an apparatus combination comprising an analog computer for making time corrections during the reproduction of respective tracks of a seismogram. Said analog computer may employ a punched card on which the distance between punched holes forms an analog to seismic time values as fully explained in said copending application. The present invention comprises apparatus for controlling the time parameter of the computer and comprises further an apparatus for properly punching the holes in the card.

In the operation of an analog computer the problem arises of entering input quantities in analog form into the apparatus. This may be done by adjusting dials by hand, but this procedure is slow and ties up valuable time of the analog computer. According to the present invention the input quantity is punched into a card in the form of an analog distance and the card then transferred to the analog computer which according to this invention is provided with an electrical stylus to sense the perforation location and convert the distance on the card to the appropriate setting of the analog computer mechanism. Distances between holes on the card may be made to correspond to any desired physical quantity and the method of using the punched card is applicable in controlling any desired parameter of an analog computer.

The term analog computer as herein used means a continuously acting computing device (cf. Computing Mechanisms and Linkages by A. Svoboda, McGraw-Hill, 1948, pp. 1–2). The term parameter is used to denote an analog computer input whose value remains fixed while the computer performs a particular computation, but whose value may be changed for another computation with the same analog computer.

By way of example, in the aforementioned seismograph profile printer the variable time correction, which is continuously applied to a track on the seismogram during the printing operation, is continuously generated by an analog computation device, one of whose parameters is the analog of time. This analog value is put into the machine by means of a punched card as described in the aforementioned copending application. The positions of the respective holes in the card represent the time values which are derived in advance from field data in well-known manner. The heretofore-known methods require these values to be entered into such a machine by means of dials or adjustments which are manually set to the indicated quantities. However, this is inconvenient and time consuming, and it substantially reduces the output speed of the computing apparatus. According to the present invention, the values of the desired quantity or quantities are punched into a card which is inserted in the machine whereupon the machine automatically sets its proper parameter according to the analog of the input quantity.

This invention will be described in the following specification, of which the drawings form a part, and in which Figure 1 is a diagrammatical view of a punch for making the punched card employed in this invention;

The apparatus comprises perforating means, for making a perforation in an electrically-nonconducting sheet, said perforating means being carried on a calibrated translating means which may be adjusted so that the perforation is made at a longitudinal distance from an index point (which may be another perforation) corresponding to the value of the input quantity, and an electrical stylus which moves with respect to the sheet in or otherwise appropriately associated with an analog computer with means for converting stylus movement into proportional movement of the computer input element representing the parameter that is to be set into the computer.

In a preferred embodiment of the invention a punch is employed for punching a small clean hole in an electrically-nonconducting paper card, said punch being carried on a calibrated lead screw which may be adjusted so that the hole is made at a longitudinal distance from an index point (which may be another hole) corresponding to the value of the input quantity, and said card being movable in a transverse direction by predetermined increments so that a plurality of quantities may be punched into the card, and an electrical stylus which moves with respect to the card in or otherwise appropriately associated with an analog computer, and means for converting stylus movement into displacement of the computer element that is analogous to the quantity to be set into the computer.

Figure 1:
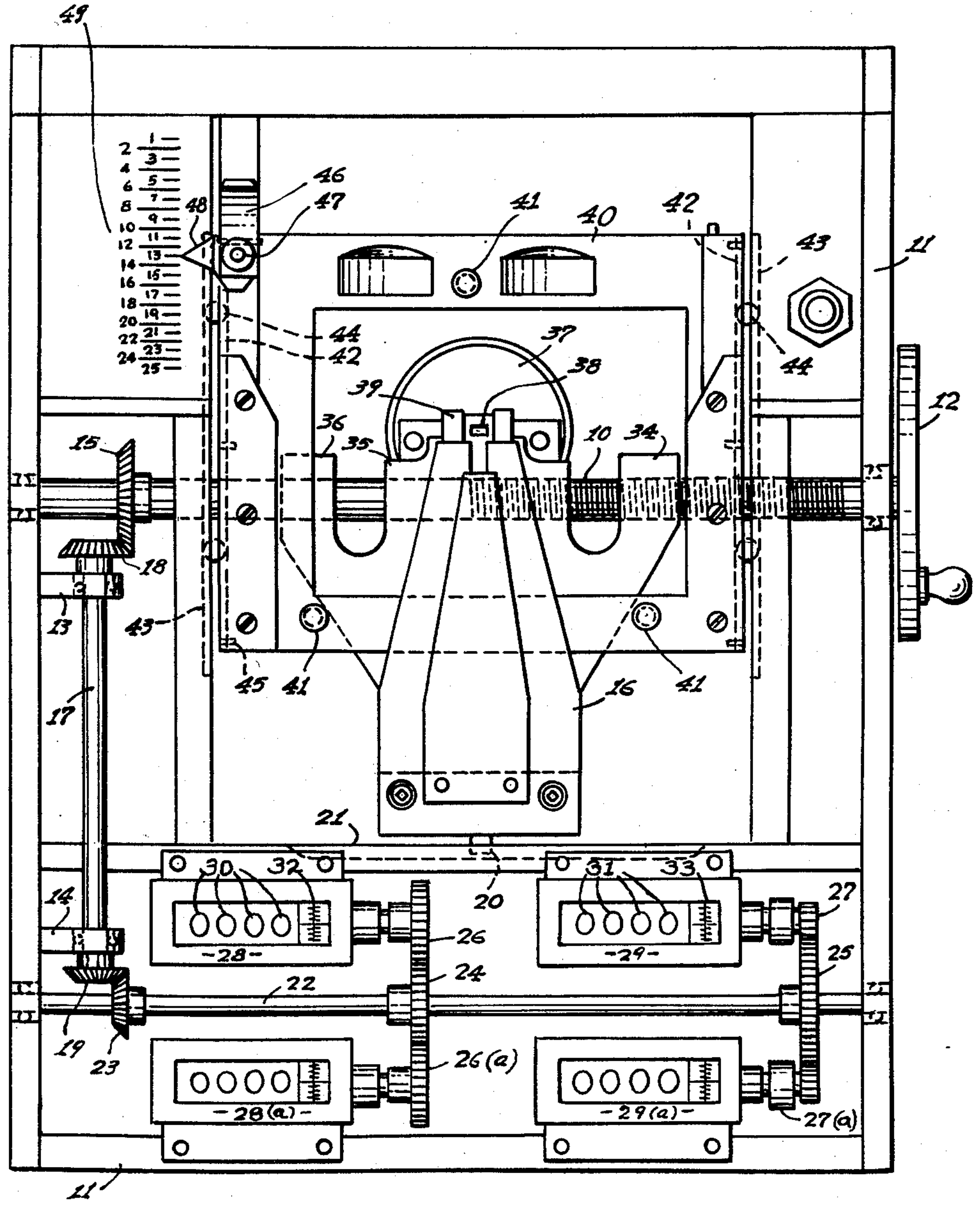

Referring to Figure 1 the apparatus comprises an outer frame 11 between the ends of which is mounted a lead screw 10 journaled in ball bearings in the frame. The outer end of the lead screw is provided with a convenient knob and handle 12 by which it may be rotated. Appropriate ball bearings are provided to accurately position the lead screw longitudinally. At the left-hand end of the lead screw a bevel gear 15 is pinned thereto. Suitable supports 13 and 14 with ball bearings are fastened to the housing 11 and support a jack shaft 17 having pinned thereto bevel gear 18 which meshes with the gear 15. Bevel gear 19 is also pinned to the shaft 17. The bottom of the frame is provided with ball bearings carrying a shaft 22 to which is pinned a bevel gear 23 meshing with gear 19 and spur gears 24 and 25. The gear 24 meshes with a pair of spur gears 26 and 26(*a*) each fastened to the shaft of a dial or counter 28 and 28(*a*). The gear 25 meshes with another pair of spur gears 27 and 27(*a*) which are pinned respectively to the shaft of a dial or counter 29 and 29(*a*). The counters 28, 28(*a*), 29, and 29(*a*) are mounted on the frame of the apparatus. Gears 26 and 26(*a*) are identical so that these gears rotate at the same rate; also gears 27 and 27(*a*) are identical. The counters 28 and 29 are made to read in the positive direction when their shafts are rotated clockwise, and the counters 28(*a*) and 29(*a*) are made to read in the positive direction when their shafts are rotated counter-clockwise. If desired counters 28(*a*) and 29(*a*) may have red characters. The counters 28 and 28(*a*) are adjusted so that both read zero at the same time, and counters 29 and 29(*a*) are similarly adjusted though they need not necessarily read zero at the same time as counters 28 and 28(*a*).

The counters 28, 28(*a*) and 29, 29(*a*) are of a type having a number of indicating digits 30 and 31 respectively, and a graduated or fractional revolution dial 32 and 33 respectively. The dials 32 and 33 are graduated so that they indicate the smallest desired fraction of a revolution required to obtain the known precision of the input quantity whose analog is to be punched into the card. If desired, the dials 32 and 33 may be divided into as many divisions as needed, and may be provided with vernier scales in well-known manner. It is apparent that by appropriate design of the gear trains and dials 32 and 33 including their verniers, it is possible to longitudinally position the carriage with any desired precision. The apparatus therefore is capable of punching a card inserted therein with the desired precision of longitudinal location of the resulting holes in the card.

The lead screw 10 carries a nut 34 which forms one arm of a Y-shaped carriage 35. The other arm 36 of the carriage has a close sliding fit on the unthreaded left-hand portion of the lead screw 10. On the lower side of the carriage 35 there is provided a solenoid 37 whose plunger actuates a punch 38. The punch may be formed to make any appropriately-shaped hole in the card, a rectangular hole being preferred. The die 39 which mates with the punch is carried on a C-shaped bracket 16 also firmly attached to carriage 35 so that the punch and die are held in alignment and a card to be punched may be slipped between them. Alternatively, the punch may be on the upper part of the bracket with the die on the lower part so that the punch may be driven manually. The lower end of the C-shaped bracket 16 is provided with a pin 20 which is a close sliding fit in a groove 21 milled in the adjacent frame member. The pin 20 thus keeps the carriage from rotating with the lead screw.

A card carriage 40 is provided above the punch and preferably on the outer front panel of the apparatus. The carriage 40 is provided with indexing buttons 41 which may be appropriately located so as to hold the card in fixed position on the carriage 40 and also arranged unsymmetrically so that the card may be inserted but one way. Three buttons 41 are shown in Figure 1, but it is apparent that two or more may be used. The carriage 40 is constrained to move in a plane parallel to the lead screw 10 and passing between the punch 38 and die 39 in the two parts of the C-shaped frame 16, and its direction of motion in this plane is accurately perpendicular to the projection of the lead screw axis in this plane. For this purpose the sides of the carriage have V-shaped grooves 42 milled therein and the respective juxtaposed frame members have similar grooves 43. Steel balls 44 ride in these face-to-face grooves, preferably two on each side. Pins are provided to keep the balls from falling out of their respective domains. Thus, the carriage may smoothly and accurately move transverse to the lead screw. The carriage 40 carries at its upper left hand corner a thumb release 46 which is hinged thereto and operates to retract upward a pin 47 which passes through a hole in the carriage 40 to an underlying escapement or transverse positioning mechanism fastened to the frame 11. The purpose of the escapement mechanism is to shift the card carriage 40 an appropriate predetermined transverse amount between each punching cycle so that the card may be used as the analog of as many quantities as desired. A pointer

48 mounted on the carriage 40 and indicating on a scale 49 fastened to the frame 11 serves to identify the transverse position of the carriage for convenience of the operator.

In the application of the invention to the aforementioned seismograph profile printer it is desired to punch holes in the card mounted on the carriage 40 so that the displacement of each hole from a zero point represents a time to be entered into the analog computer of the seismograph profile printer. In such application of this invention, it is convenient to make the lateral spacing between the card holes pertaining to the respective seismogram track equal to the distance between the respective tracks on the seismogram. Accordingly, the pin 47 is arranged to cooperate with an escapement (not shown) which provides a transverse displacement of the card. An example of such an escapement mechanism is fully described in the aforementioned copending application.

It is apparent that any desired means for transversely positioning the carriage 40 may be employed, as for example, a perforated plate may be provided below the carriage 40 and the pin 47 dropped into its perforations in succession. The perforations are spaced so that they position the carriage as desired and the carriage may be placed in the respective positions by manually withdrawing the pin by pressing thumb release 46, sliding the carriage to its next position, and dropping the pin in a new perforation. Alternatively, a rack with a lever-actuated pawl may be used to transversely space the carriage 40.

In the operation of the device shown in Figure 1, the card is inserted on the carriage 40 and accurately positioned thereon by the indexing buttons 41. The carriage 40 is placed in the appropriate transverse position and held in place by means of pin 47. The lead screw handle 12 is then rotated to set the indicator at the known value of the physical quantity whose analog is desired and a hole is punched in the card by momentarily electrically actuating the solenoid 37 or by striking the punch. The longitudinal location of the resulting hole in the card will be accurately established with respect to an index or zero point on the card. It has been found convenient to set the carriage to one end of its transverse travel and set the lead screw to a zero position for punching a hole at the zero point on the card. The transverse positioning means is then advanced one step, and the lead screw is again adjusted to move the punch to a desired new longitudinal location and the second hole punched. Alternatively the indicator may be set to zero, a hole punched, and the indicator then set to a desired reading and another hole punched, whereupon the distance between the two holes is an analog of the indicated quantity. As many transversely-spaced quantities may be punched into the card as desired for the particular application in which the card is to be used, each such hole being longitudinally positioned with respect to a zero point or hole on the card by turning the lead screw handle 12 an amount which produces a dial reading on the counter corresponding to the physical quantity whose analog is to be set into the computer by means of the card.

In Figure 1 the lead screw is shown driving two pairs of counters, namely 28 and 28(*a*), and 29 and 29(*a*), the first pair being driven by gears 26 and 26(*a*) which mesh with gear 24 and the second pair being driven by gears 27 and 27(*a*) which mesh with gear 25. The gear ratios are independent and are provided so that the punching device may be employed to punch cards with different analog factors. The second pair of counters 29 and 29(*a*) is provided so that the apparatus may be used for punching cards which are analogs of some other quantity or which are the analogs of the same quantity with a different scale factor. The respective gear trains are made such that the quantity to be punched into the card is properly related to the longitudinal displacement of the punch 38 effected by the lead screw 10 when the latter is adjusted for the respective analog quantity. It is apparent that if the punching apparatus is to be used for only a single quantity at a single scale factor only one gear train and counter is necessary, and that as many additional gear trains and counters or dials may be provided as desired for other analog quantities or different scale factors.

By way of example, in connection with the seismograph profile printer previously mentioned, if it is desirable to have the longitudinal displacement of the hole in the card represent travel time with a scale factor of 5 inches per second, the pitch of the lead screw and the gear ratios are so adjusted that on counter 28 a reading of 0.1000 second represents 0.5000 inch of movement of the punch 38. In this manner a punched card having distances between holes forming an analog to time may accurately be made.

Figure 2:
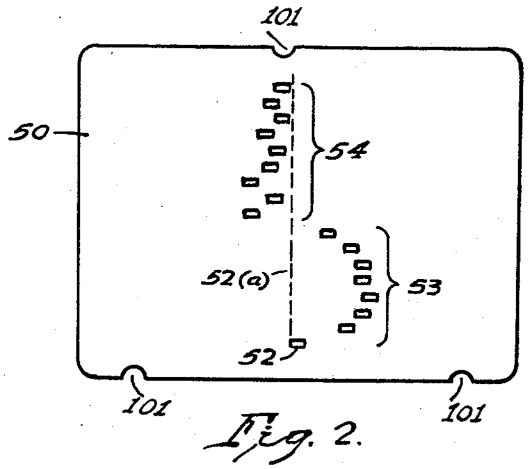
Figure 2 shows an example of a preferred type of punched card employed in this invention.

A preferred form of punched card produced by the device of Figure 1 is shown in Figure 2. It comprises a thin sheet of electrically-nonconducting material of suitable dimensions, preferably of index-card stock about .0085" thick and preferably having 50% or more rag content. The card 50 is cut to a convenient size for the desired application and fits into the carriage 40 of Figure 1, being accurately positioned thereon. It is convenient to punch accurately-located notches 101 into the card prior to its insertion in the punching machine of Figure 1, these notches assuring accurate location of the card by indexing buttons 41 in the punch of Figure 1 and in subsequent use. A zero hole 52 may be initially made with the punch but this is not essential, since the card is longitudinally accurately positioned on the carriage of Figure 1 during the punching operation. In Figure 2, the left edge of each punched hole is the positional reference for the analog values which the holes represent. The line 52(*a*) is the projection of the left edge of zero hole 52 across the card with respect to positioning notches 101. Thus the analog distances from the zero hole 52 to holes 53 and 54 are the distances from line 52(*a*) to the left edges of holes 53 and 54 respectively. It is thus evident that correct analog values can be read from the card for all holes 53 and 54, and a zero hole is not required to be punched in the same horizontal row for each hole. The holes 54 longitudinally to the left of the zero point of hole 52 represent positive values and the holes 53 to the right of the zero point represent negative values, or vice versa, the respective positive or negative analog values having previously been punched in the card for appropriate settings of counters 28 and 28(*a*), or counters 29 and 29(*a*). It is apparent also that the zero point may be completely off the card, and the hole displacements will then represent residuals between the respective quantities represented.

In the manner above described, the card 50 is converted into an analog of the chosen physical quantity or quantities with the longitudinal location of each hole or its longitudinal distance from the zero hole corresponding to a value of the quantity.

The card of Figure 2 whose perforations now have location or spacing corresponding to the value of the physical quantity for which an element of the computer forms the analog is now inserted in an appropriate card holder on the analog computer. The card holder has indexing buttons similar to those indicated in Figure 1 by 41. The computer has an electrical hole-sensing mechanism and by providing the card 50 with a zero hole 52 to which the sensing mechanism may be initially adjusted, the need for accurately positioning the card is somewhat relaxed and the card needs only to be clamped down in proper orientation.

Figure 3:
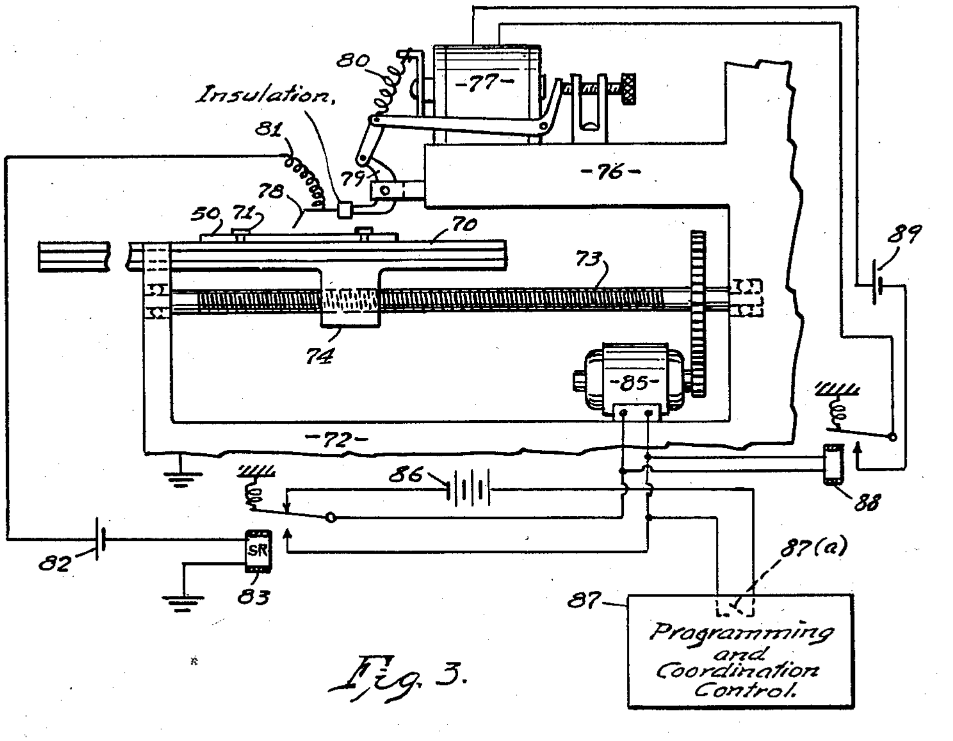
Figure 3 shows a diagrammatical view of an apparatus for converting the punched card of this invention into translatory motion of a computing machine element which carries the card along with it.

An example of an application of this invention is shown in Figure 3 wherein the card is mounted on a movable member 70, translation of which is to be set to a value which is the analog of the chosen physical quantity. The card 50 is held in position on the member 70 by indexing buttons 71. The longitudinal axis of the card 50 is parallel to the direction of motion of the member 70. The frame 72 of the computer is provided with a motor-driven lead screw 73 accurately positioned in the frame between ball bearings, as shown. The machine member carries a threaded nut 74 which rides the lead screw 73. The lead screw is geared to a motor 85 which may be braked electromagnetically when its terminals are short-circuited or by other well-known means such as an electromagnetically-controlled brake or electromagnetically-released clutch. The movable member 70 runs in suitable guides or rails on the frame 72. A stylus 78 is carried by an insulating block on an arm 79 which may rotate on a pin through a forked extension of the frame member 76. The stylus preferably comprises a plurality of fine electrically-conducting wires of spring metal in the same transverse plane. This insures that when the stylus drops into a hole, one or more of the wires will make electrical contact with the member 70 underlying the card 50. In the event member 70 is electrically nonconducting, a metal plate (not shown) is placed under the card 50 and connected to provide the necessary electrical contacting element for the stylus 78. A coil 77 is provided on the frame 76 and has a magnetic armature connected by a linkage to depress the stylus 78 when the coil 77 is energized. A spring 80 lifts the stylus off the card 50 when the coil 77 is deenergized. The stylus is connected into an electrical circuit by means of a flexible pigtail wire 81, the circuit comprising the stylus 78, the member 70 and frame 72 of the machine (which may be grounded), a battery 82 and a relay coil 83. Relay 83 is a fast-acting, slow-release type. The relay contacts are so arranged that when the relay coil 83 is not energized, the motor 85 is connected to a power source schematically indicated by battery 86 and any other circuits required to coordinate the actuation of the element 70 and motor 85 with other elements of the computer, as by programming and coordination control 87. At the same time that the power is applied to motor 85 by the control 87, as by closing switch 87(*a*), whereby element 70 moves to the left, the relay 88 operates and causes battery 89 to energize coil 77, thereby depressing the stylus 78. Thus when the coordinating means 87 closes the motor circuit to move the member 70 into desired longitudinal position, the motor 85 rotates the lead screw 73 and the member 70 moves to the left until the stylus 78 drops into a hole in the card 50. This closes the circuit of relay 83, which opens the motor-drive circuit and also short circuits the motor armature thus braking the motor and bringing it to a quick stop. The member 70 is now in the analog position corresponding to the known value of the input quantity. The control 87 is arranged to open the circuit at 87(*a*) prior to the release of slow-release relay 83, by other circuit means not shown. In the aforementioned copending application such circuit means are disclosed. The coordination control 87 may proceed to other computer functions dependent on the longitudinal position of element 70.

Figure 4:
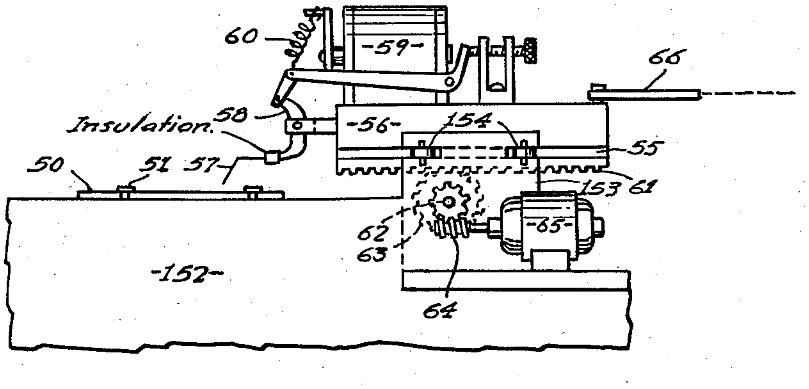
Figure 4 shows a diagrammatical view of an apparatus for converting the punched card of this invention into translatory motion of a computing machine element, the card being held stationary on the computer.

Another example of the manner in which the card 50 is employed is shown in Figure 4. The card 50 in this case is mounted on the frame or base 152 of the computer, the indexing buttons being indicated by 51. The computer has a stylus carriage 56 which rides smoothly in the longitudinal direction of the card between two guide blocks 153 (only the forward one of which appears in Figure 4) fastened to the base 152. Rollers 154 on each guide block 153 engage a groove 55 in each side of the carriage 56. A stylus 57 is carried by an insulating block on an arm 58 which may rotate on a pin through a forked extension of the carriage 56. A coil 59 is provided on the carriage 56 and has a magnetic armature connected by a linkage to depress the stylus 57 when the coil 59 is energized. A spring 60 lifts the stylus off the card 50 when the coil 59 is de-energized. A rack 61 is fastened to the bottom of the carriage and is engaged by a gear on a transverse shaft 62. The front end of the shaft carries a worm gear 63 engaging a motor-driven worm 64. Rotation of the motor 65 thus effects longitudinal motion of the carriage 56. The carriage 56 is connected to the computer by appropriate means indicated diagrammatically in Figure 4 by mechanical link 66. The motor 65, stylus 57, and coil 59, are connected to relays and coordinating means in a manner similar to that described with reference to Figure 3. Thus by means of the apparatus of Figure 4, the computer link 66 is automatically set to the desired analog value, whereupon the coordinating means causes the computer to proceed with other functions dependent thereon.

Figure 5:
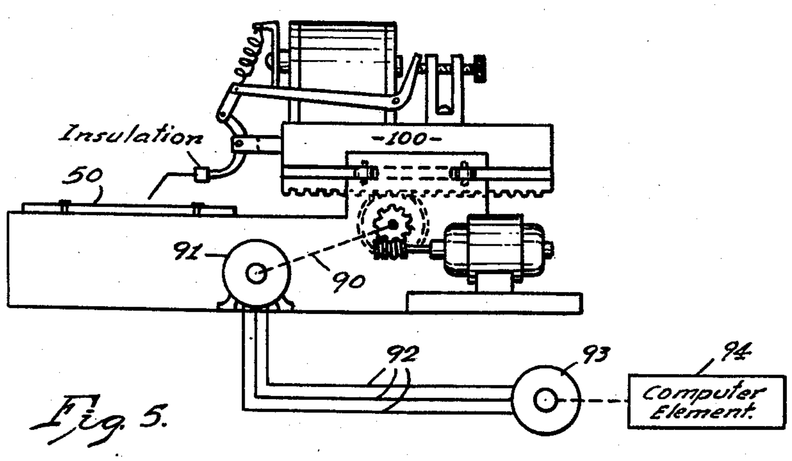
Figure 5 shows a diagrammatical view of an apparatus for reading the punched card and converting the represented quantities into rotation of any desired computing machine element.

Figure 5 shows another apparatus by which the punched card may be used to set the rotary position of a computer machine element. The stylus carriage 100 is substantially the same as that shown in Figure 4. The shaft 90 is however also connected to a selsyn transmitter 91 whose output signal is transmitted by wires 92 to a selsyn receiver 93 which may be located at any convenient place in the computer. The selsyn receiver 93 is mechanically connected to turn the shaft of any desired element 94 of the computer either by direct coupling or through a gear train. Thus for instance selsyn receiver 93 may angularly position the shaft of a rheostat or voltage control (potentiometer) or it may be employed to angularly position a mechanical element of the computer, the value of these parameters then being the analog of the original physical quantity punched into the card 50. The stylus circuit, stylus-depress circuit, and motor-control circuit are similar to those shown in Figure 3. It is apparent that by means shown in Figure 5, the angular position of any desired element is automatically set to the desired analog quantity.

It is apparent that by using a plurality of styluses and stylus-control means, it is possible by this invention to set several elements of a computer to their respective analog positions. The styluses may operate on the same card or on different cards as is convenient. The operator needs only to insert the card, and all other operations are performed automatically. By means of this invention an element of an analog computer is automatically set without requiring further the attention of the operator. Inasmuch as the setting process is automatic it may be done rapidly, and it may be done repeatedly by transverse displacements of the card between successive settings as is done in the seismograph profile printer previously mentioned. Furthermore, the setting process is performed with precision and without human error.

An important aspect of this invention lies in the feature that the resulting setting put into the computer is independent of the relative speed of the stylus and the card since this motion ceases upon their reaching the proper displacement. The analog parameter of the computer is thus accurately and precisely positioned to the value of the physical quantity to be represented.

What I claim as my invention is:

1. In an analog type of computing machine having a continuously adjustable input element whose position is an analog of a parameter involved in a computation to be performed, the improvement which comprises means associated with the computing machine adapted to position an electrically non-conducting sheet having a perforation therein whose location on the sheet is spaced from a standard of reference by an amount that is directly proportional to the desired analog movement of the computing machine input element, an electric circuit, a stylus adapted to traverse said sheet and connected in said electric circuit, means for moving said stylus with respect to said sheet along a line through said perforation and in the direction of perforation spacing, means connected to the computing machine input element and to said stylus-moving means moving the computing machine input element in synchronism with and proportional to the relative motion of said stylus and said sheet, and control means connected to said electric circuit arresting motion of said computing machine input element and said stylus at any position along its path of travel upon closure of said stylus circuit.

2. In an analog type of computing machine having a continuously adjustable input element whose position is an analog of a parameter involved in a computation to be performed, the improvement which comprises means associated with the computing machine adapted to position a sheet having a perforation therein whose location on the sheet is spaced from a standard of reference by an amount that is directly proportional to the desired analog movement of the computing machine input element, perforation-sensing means adapted to traverse said sheet, means for moving said perforation sensing means with respect to said sheet along a line through said perforation and in the direction of perforation spacing, means connected to the computing machine input element and to said perforation-sensing means moving the computing machine input element in synchronism with and proportional to the relative motion of said perforation sensing means and said sheet, and control means connected to said perforation-sensing means and to the computing machine input element moving means, said control means arresting motion of said computing machine input element and said perforation-sensing means at any position along its path of travel upon sensing of a perforation by said perforation-sensing means.

References Cited in the file of this patent

UNITED STATES PATENTS

| | | |
|---|---|---|
| 1,132,345 | Hollerith | Mar. 16, 1915 |
| 2,270,461 | Mills | Jan. 20, 1942 |
| 2,508,603 | Gollwitzer | May 23, 1950 |